(12) United States Patent
Baron Von Ceumern-Lindenstjerna et al.

(10) Patent No.: US 10,934,912 B2
(45) Date of Patent: Mar. 2, 2021

(54) METHOD FOR THE EXHAUST AFTERTREATMENT OF AN INTERNAL COMBUSTION ENGINE AND EXHAUST AFTERTREATMENT SYSTEM

(71) Applicant: VOLKSWAGEN AKTIENGESELLSCHAFT, Wolfsburg (DE)

(72) Inventors: Falk-Christian Baron Von Ceumern-Lindenstjerna, Braunschweig (DE); Stefan Paukner, Wolfsburg (DE); Michael Alexander Manz, Langenhagen (DE); Michael Kaack, Rötgesbüttel (DE); Jens Gockel, Bestwig (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/525,205

(22) Filed: Jul. 29, 2019

(65) Prior Publication Data
US 2020/0040784 A1    Feb. 6, 2020

(30) Foreign Application Priority Data
Jul. 31, 2018 (DE) ...................... 10 2018 118 565.0

(51) Int. Cl.
*F01N 3/20* (2006.01)
*F01N 3/30* (2006.01)
(Continued)

(52) U.S. Cl.
CPC ............... *F01N 3/20* (2013.01); *F01N 3/101* (2013.01); *F01N 3/2892* (2013.01); *F01N 3/30* (2013.01); *F01N 2610/06* (2013.01)

(58) Field of Classification Search
CPC . F01N 3/20; F01N 3/30; F01N 3/2892; F01N 3/101; F01N 2610/06;
(Continued)

(56) References Cited

U.S. PATENT DOCUMENTS 3,730,157 A * 5/1973 Gerhold ................... F02D 9/00
123/437
3,768,259 A * 10/1973 Carnahan ................. F02D 9/00
60/276

(Continued)

FOREIGN PATENT DOCUMENTS

DE          1235667 B      3/1967
DE       41 32 814 A1      4/1993
(Continued)

OTHER PUBLICATIONS

Search report for German Patent Application No. 10 2018 118 565.0, dated Jul. 17, 2019.
(Continued)

*Primary Examiner* — Hoang M Nguyen
(74) *Attorney, Agent, or Firm* — Pearl Cohen Zedek Latzer Baratz LLP

(57) ABSTRACT

The invention relates to a method for the exhaust aftertreatment of an internal combustion engine, which on the outlet side is connected to an exhaust gas system. Provided in the exhaust gas system is at least one exhaust aftertreatment component with which, upon reaching the light-off temperature of this exhaust aftertreatment component, the gaseous limited exhaust gas components may be converted into unlimited exhaust gas components. An introduction point is provided at an exhaust duct of the exhaust gas system, at which a hot gas, in particular an exhaust gas of an exhaust gas burner, is introduced into the exhaust duct. The hot gas mixes with the exhaust gas of the internal combustion engine in such a way that a hot mixed gas results in which
(Continued)

the unburned exhaust gas components are oxidized to unlimited exhaust gas components, without a catalytically active surface. It is provided that the introduction of the hot gas is set as soon as the exhaust gas components of the exhaust aftertreatment system have reached their respective light-off temperature.

13 Claims, 2 Drawing Sheets

(51) Int. Cl.
*F01N 3/28* (2006.01)
*F01N 3/10* (2006.01)

(58) Field of Classification Search
CPC ..... F01N 2900/1402; F01N 2900/1404; F01N 2900/1411; F01N 2900/08; F01N 2900/1626; F01N 2900/1602; F01N 2430/06; F01N 2560/025; F01N 2560/14; F01N 9/00; F01N 2240/14; F01N 2240/20; F01N 3/029; F01N 13/009; F01N 3/2006; F01N 3/2033; F01N 3/035
USPC ......... 60/274, 277, 282, 286, 299, 301, 302, 60/304–306
See application file for complete search history.

(56) References Cited

U.S. PATENT DOCUMENTS

| | | |
|---|---|---|
| 5,617,720 A | 4/1997 | Achleitner et al. |
| 2009/0126354 A1* | 5/2009 | Gieshoff ............ B01D 53/9495 60/320 |
| 2013/0006504 A1* | 1/2013 | Schreurs ................. F01N 3/101 701/108 |
| 2015/0186232 A1 | 7/2015 | Conner et al. |
| 2015/0260071 A1* | 9/2015 | Reichert ............... F01N 3/2066 423/239.1 |
| 2018/0093224 A1 | 4/2018 | Lau et al. |

FOREIGN PATENT DOCUMENTS

| | | |
|---|---|---|
| DE | 42 39 081 A1 | 5/1994 |
| DE | 44 30 965 A1 | 3/1996 |
| DE | 11 2010 003 098 T5 | 8/2012 |
| DE | 10 2011 119 163 A1 | 5/2013 |
| DE | 10 2012 016 673 A1 | 2/2014 |
| DE | 10 2013 013 663 A1 | 2/2015 |
| DE | 10 2015 212 514 A1 | 1/2017 |
| DE | 10 2015 215 373 A1 | 2/2017 |
| DE | 10 2016 206 394 A1 | 10/2017 |

OTHER PUBLICATIONS

Search report for European Patent Application No. 19188744.7, dated Nov. 5, 2019.

* cited by examiner

METHOD FOR THE EXHAUST AFTERTREATMENT OF AN INTERNAL COMBUSTION ENGINE AND EXHAUST AFTERTREATMENT SYSTEM

CROSS-REFERENCE TO RELATED APPLICATIONS

This application claims priority from German Patent Application No. 10 2018 118 565.0, filed Jul. 31, 2018, which is hereby incorporated by reference.

FIELD OF THE INVENTION

The invention relates to an exhaust aftertreatment system for an internal combustion engine, and a method for the exhaust aftertreatment of such an internal combustion engine according to the preambles of the independent claims.

BACKGROUND OF THE INVENTION

The increasing stringency of current and future exhaust emission regulations is placing high demands on uncontrolled engine emissions and the exhaust aftertreatment of internal combustion engines. The requirements for further decreases in fuel consumption and the continual tightening of exhaust emission standards with regard to allowable nitrogen oxides emissions pose a challenge for engine developers. For diesel engines, exhaust aftertreatment systems are currently in use which have an oxidation catalytic converter, a catalytic converter for selective catalytic reduction of nitrogen oxides (SCR catalytic converter), a particulate filter for separating soot particles, and optionally further catalytic converters. Ammonia is preferably used as reducing agent. For gasoline engines, the exhaust gas purification takes place in a known manner via one or more three-way catalytic converter(s), as well as further catalytic converters connected upstream and downstream from the three-way catalytic converter, and optionally a particulate filter. In order to achieve efficiency, each device for catalytic exhaust gas purification requires exceedance of a minimum temperature, the so-called light-off temperature. However, a disadvantage of the known systems is that after a cold start of the internal combustion engine, the catalytic converters must initially be heated to their light-off temperature so that the limited pollutant components contained in the exhaust gas may be converted to harmless exhaust gas components.

A combustion device for placement in an exhaust duct of an internal combustion engine is known from DE 10 2011 119 163 A1, wherein the combustion device comprises a plurality of metallic foils or ceramic plates in the exhaust duct and has a porous burner, and the metallic foils or ceramic plates divide the exhaust duct into multiple combustion chambers, and a mixing zone is formed between the porous burner and the metallic foils or ceramic plates, and wherein the flow cross section in the combustion chambers formed by the metallic foils or ceramic plates expands in the flow direction in such a way that flame flashback from the combustion chambers in the direction of the porous burner is prevented.

DE 11 2010 003 098 T5 discloses an exhaust gas burner for an internal combustion engine, wherein the exhaust gas burner is situated perpendicular to the exhaust duct and upstream from a particulate filter, and wherein by means of the exhaust gas burner the exhaust gas temperature of the internal combustion engine is increased prior to entry into the particulate filter.

An exhaust aftertreatment device having an ozone generator and a catalytic converter is known from US 2018/0093224 A1, wherein in the catalytic converter, unburned carbon particles are converted to carbon dioxide by means of the ozone from the ozone generator.

A device for afterburning of combustible components in the exhaust gas of an internal combustion engine is known from DE 1235667 B. It is provided that the exhaust gas together with fresh air is introduced into a combustion chamber, and the unburned exhaust gas components are then exothermically reacted with the fresh air.

However, a disadvantage of the known approaches is that they are very complex and/or require a large amount of installation space.

SUMMARY OF THE INVENTION

The object of the invention is to propose an exhaust aftertreatment device and a method for the exhaust aftertreatment, with which limited exhaust gas components such as unburned hydrocarbons (HC) and carbon monoxide (CO) may be converted before the light-off temperature of the catalytically active surfaces is reached, and the emissions may thus be reduced, in particular in the cold start phase of the internal combustion engine.

According to the invention, this object is achieved by a method for the exhaust aftertreatment of an internal combustion engine, which on the outlet side is connected to an exhaust gas system, wherein at least one exhaust aftertreatment component is situated in the exhaust gas system, and wherein an introduction point for introducing a hot gas is formed at an exhaust duct of the exhaust gas system. The method comprises the following steps:

- operating the internal combustion engine with a fuel-air mixture,
- introducing the exhaust gases of the internal combustion engine into the exhaust duct,
- introducing a hot gas into the exhaust duct at an introduction point, wherein the hot gas mixes with the exhaust gas of the internal combustion engine in a mixing zone, so that a stoichiometric or overstoichiometric exhaust gas results downstream from the mixing zone, and
- oxidizing the unburned exhaust gas components, in particular unburned hydrocarbons (HC), carbon monoxide (CO), and hydrogen ($H_2$), in a reaction zone (48) downstream from the mixing zone, wherein the unburned exhaust gas components are reacted with the residual oxygen in the mixed gas.

In order to achieve efficiency, each device for catalytic exhaust gas purification requires exceedance of a minimum temperature, the so-called light-off temperature. If this temperature is not yet reached after a cold start of the internal combustion engine, the harmful exhaust gas components of the exhaust gas of the internal combustion engine leave the exhaust gas system and are emitted to the environment. For this reason, the emissions are especially high, in particular in the cold start phase. By use of a method according to the invention, the unburned exhaust gas components may already be reacted with the hot gas in the exhaust duct before one of the catalytic converters has reached its light-off temperature. As a result, the exhaust gas emissions may be reduced, in particular in the cold start phase of the internal combustion engine, and harmful exhaust gas components may be converted, regardless of the temperature of the catalytic converter.

Advantageous refinements and enhancements of the method for exhaust aftertreatment stated in the independent claim are possible by means of the features set forth in the dependent claims.

In one preferred embodiment of the method, it is provided that the internal combustion engine is operated with an understoichiometric combustion air ratio, and the hot gas is rich in oxygen. Due to understoichiometric operation, on the one hand the uncontrolled emissions of nitrogen oxides may be minimized. On the other hand, the unburned exhaust gas components, in particular unburned hydrocarbons (HC), carbon monoxide (CO), methane ($CH_4$), and hydrogen ($H_2$), may be oxidized by the hot oxygen-rich gas, so that the emissions may be minimized.

In one preferred application of the method, it is provided that the understoichiometric combustion air ratio is adjusted during an enrichment in an acceleration phase or full load phase of the internal combustion engine. In certain operating points of the internal combustion engine, an enrichment of the combustion air ratio combustion air ratio in the direction of an understoichiometric combustion air ratio may be provided in order to increase power and/or to avoid critical peak temperatures. In such an operating phase, the exhaust aftertreatment may be assisted by a method according to the invention in order to assist the oxidation of the unburned exhaust gas components.

In another preferred application of the method, it is provided that the understoichiometric combustion air ratio is selected for regeneration of an exhaust aftertreatment component, in particular regeneration of a NOx storage catalytic converter or for desulfurization of such a catalytic converter. Understoichiometric operation of the internal combustion engine is necessary for regeneration of a NOx storage catalytic converter or for desulfurization of such a catalytic converter. Since in particular desulfurization requires a comparatively long understoichiometric operation of the internal combustion engine, in the methods known from the prior art a change must be frequently made between an understoichiometric operation and a stoichiometric normal operation, since the oxygen store capability of the wash coat of a catalytic converter is too low for such a long understoichiometric operation. A method according to the invention may likewise be used to assist the exhaust aftertreatment in such an understoichiometric operating phase.

In another preferred application of the method, it is provided that the understoichiometric operation is selected for protection of a component of the internal combustion engine and/or of the exhaust gas system. To avoid thermal overload of a component of the internal combustion engine, in particular the exhaust valves, or thermal overload of a component of the exhaust gas system, in particular the turbine of the exhaust gas turbocharger or a catalytic converter, in certain operating situations, enrichment of the combustion air ratio in the direction of an understoichiometric combustion air ratio may likewise be provided. By use of a method according to the invention, in particular by introducing the hot gas downstream from the component to be protected, the emissions may be reduced, even with enrichment for component protection.

In another preferred application of the method, it is provided that the method according to the invention is carried out in a cold start phase of the internal combustion engine in which one or more catalytic converters, in particular a three-way catalytic converter, situated in the exhaust gas system have/has not yet reached their/its light-off temperature. Since conversion of the pollutants on the catalytically active surfaces of the exhaust aftertreatment components is not yet possible in the cold start phase, the proposed method, in particular in this cold start phase, is suitable for reducing the emissions of the internal combustion engine by oxidizing the unburned exhaust gas components.

In another enhancement of the method, it is provided that the introduction of the hot gas is deactivated as soon as an exhaust aftertreatment by means of the exhaust aftertreatment components is possible. Since the energy necessary for generating the hot gas reduces the efficiency of the internal combustion engine, by adjusting the method at the right time it is possible to save fuel and increase the overall efficiency of the internal combustion engine.

In one preferred embodiment of the method, it is provided that a mixing ratio of hot gas to exhaust gas of the internal combustion engine is selected for which a temperature of at least 650° C. develops in the reaction zone. Above a temperature of approximately 650° C., no additional catalytically active surface is necessary to oxidize the unburned fuel components in the exhaust duct. A conversion may thus take place directly in the reaction zone in the exhaust duct. The flow resistance may be kept low, since no additional exhaust aftertreatment components which would increase the exhaust gas back pressure are necessary.

According to the invention, an exhaust aftertreatment system for an internal combustion engine having an exhaust gas system is proposed, wherein at least one exhaust aftertreatment component is situated in the exhaust gas system, and wherein an introduction point for introducing a hot gas is provided at an exhaust duct of the exhaust gas system. It is provided that the exhaust aftertreatment system includes a control unit, wherein the control unit is configured for carrying out a method according to the invention for the exhaust aftertreatment of an internal combustion engine when a machine-readable program code is executed by the control unit. A method according to the invention for exhaust aftertreatment may be easily implemented by use of a proposed exhaust aftertreatment system.

In one preferred embodiment of the exhaust aftertreatment system, it is provided that the hot gas is generated by an exhaust gas burner. An exhaust gas burner provides a simple and comparatively inexpensive approach to providing the hot gas for the method according to the invention for exhaust aftertreatment. In addition, an exhaust gas burner requires only a small installation space and may be integrated into an exhaust gas system with comparatively little effort, in particular when the introduction point is positioned in an underbody position of a motor vehicle.

In one advantageous embodiment of the exhaust aftertreatment system, it is provided that a mixing element is situated in the mixing zone. The mixing of exhaust gas and hot gas may be improved by means of a mixing element, resulting in a more homogeneous mixed gas. As a result, the reaction speed during the oxidation of the unburned exhaust gas components may be increased, and the efficiency of the exhaust aftertreatment system may thus be improved.

In another enhancement of the exhaust aftertreatment system, it is provided that an element for reducing the flow speed of the mixed gas in the exhaust duct is situated in the mixing zone and/or in the reaction zone. To achieve the most efficient oxidation possible of the unburned exhaust gas components, a sufficient residence time of the mixed gas in the reaction zone is necessary. Therefore, it is meaningful to appropriately reduce the flow speed in this exhaust duct section.

It is particularly preferred that the exhaust duct has a cross-sectional expansion in the area of the reaction zone. A cross-sectional expansion of the exhaust duct in the reaction zone is a particularly simple and cost-effective option for reducing the flow speed. The exhaust duct is preferably designed as a diffuser. Alternatively or additionally, further elements may be provided to at least partially block the exhaust duct cross section and hinder the mixed gas from flowing out of the reaction zone.

In one preferred embodiment of the exhaust aftertreatment system, it is provided that the at least one component for exhaust aftertreatment includes a three-way catalytic converter, a NOx storage catalytic converter, a particulate filter, and/or a four-way catalytic converter. The internal combustion engine is preferably designed as a spark ignition internal combustion engine according to the Otto spark ignition principle. To achieve efficient exhaust aftertreatment, a three-way catalytic converter and a particulate filter or a four-way catalytic converter are preferably situated in the exhaust gas system. Thus, in addition to the limited gaseous emissions, the particulate emissions of the internal combustion engine may also be reduced.

In one preferred embodiment, it is provided that the introduction point is provided downstream from a first three-way catalytic converter and upstream from a second component having three-way catalytic activity, in particular a further three-way catalytic converter or a four-way catalytic converter. As a result, the first three-way catalytic converter close to the engine may be heated by engine-internal measures, and a further three-way catalytic converter or a four-way catalytic converter in the underbody position of a motor vehicle may be heated via the hot gas, essentially independently of the exhaust gas stream. The time for at least one of the catalytic converters to reach its light-off temperature after a cold start of the internal combustion engine may thus be shortened.

The various embodiments of the invention mentioned in the present patent application, unless stated otherwise in the individual case, may advantageously be combined with one another.

BRIEF DESCRIPTION OF THE DRAWINGS

The invention is explained below in exemplary embodiments, with reference to the associated drawings. Identical components or components having the same function are denoted by the same reference numerals in the various figures. In the figures.

DETAILED DESCRIPTION OF THE INVENTION

Figure 1:
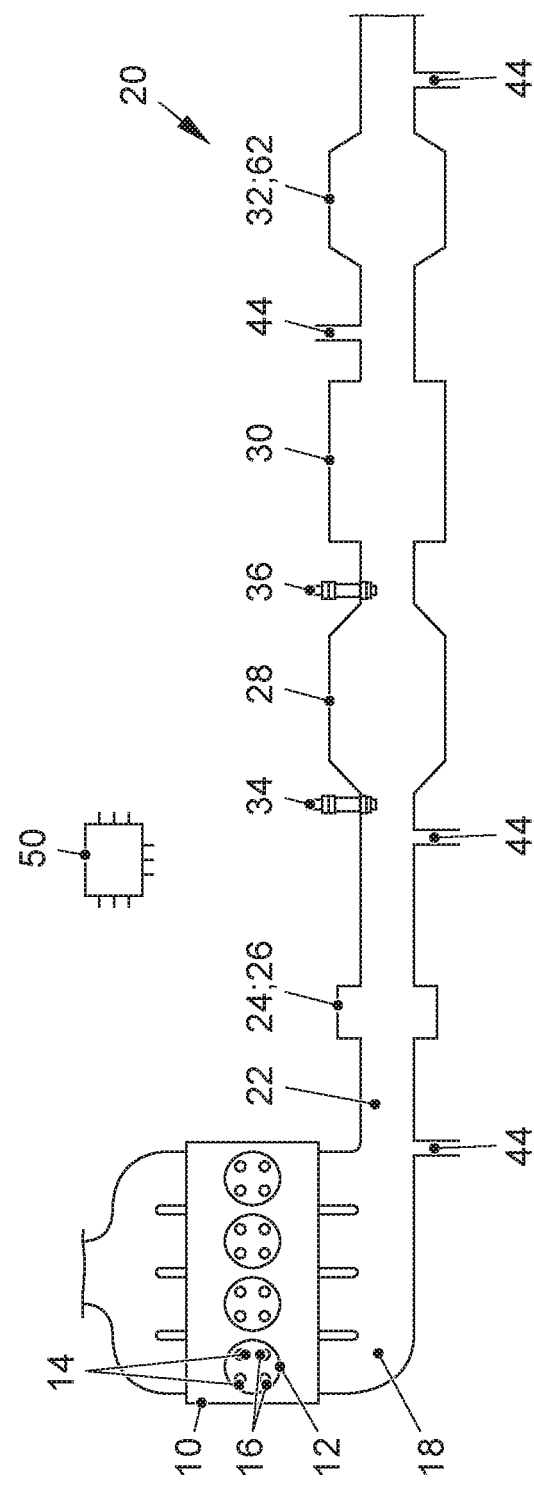
FIG. 1 shows an internal combustion engine with an exhaust aftertreatment system according to the invention.

FIG. 1 shows an internal combustion engine 10 having an exhaust aftertreatment system according to the invention, in a schematic illustration. The internal combustion engine 10 has a plurality of combustion chambers 12 at which at least one intake valve 14 and one exhaust valve 16 is situated in each case. The internal combustion engine 10 has an intake via which the internal combustion engine 10 is connectable to an air supply system, not illustrated for reasons of clarity. The internal combustion engine 10 also has an exhaust gas aspirator 18 via which the internal combustion engine 10 is connected to an exhaust gas system 20 in such a way that an exhaust gas may be conducted from the combustion chambers 12 of the internal combustion engine 10 into the exhaust gas system 20 when the exhaust valves 16 are open. The exhaust gas system 20 includes an exhaust duct 22 in which a turbine 26 of an exhaust gas turbocharger 24, a three-way catalytic converter 28 downstream from the turbine 26, and a particulate filter 62 or a four-way catalytic converter 32 downstream from the three-way catalytic converter 28 are situated in the flow direction of an exhaust gas 52 of the internal combustion engine 10 through the exhaust duct 22. Optionally, a NOx storage catalytic converter 30 may be additionally situated downstream from the three-way catalytic converter 28 and upstream from the particulate filter 62 or the four-way catalytic converter 32. Alternatively, the order of the exhaust aftertreatment components 28, 30, 32 may be interchanged. In addition, in a simplified design of the exhaust aftertreatment system the particulate filter 62 or the four-way catalytic converter 32 may be omitted. The three-way catalytic converter 28, as the first component of the exhaust aftertreatment, is preferably situated in a position in the exhaust gas system 20 close to the engine. In this context, a position close to the engine is understood to mean a position with an exhaust gas running length of less than 80 cm, preferably less than 50 cm, beginning at the exhaust gas aspirator 18 of the internal combustion engine 10. The particulate filter 62 or the four-way catalytic converter 32 is preferably situated in an underbody position of a motor vehicle. In addition, an electric heating element may be provided, with which at least one of the catalytic converters 28, 30, 32 or the particulate filter 62 is electrically heatable.

A first lambda sensor 34 is situated in the exhaust duct 22, downstream from the turbine 26 of the exhaust gas turbocharger 24 and upstream from the three-way catalytic converter 28. The first lambda sensor 34 is preferably designed as a broadband sensor, and thus allows a quantitative assessment of the combustion air ratio upstream from the three-way catalytic converter 28. A second lambda sensor 36, which is preferably designed as a jump sensor, is provided in the exhaust duct 22, downstream from the three-way catalytic converter 28 and upstream from the second catalytic converter 30. The combustion air ratio of the internal combustion engine 10 is controllable via the two lambda sensors 34, 36. In addition, at least one introduction point 44 for introducing a hot gas 54 into the exhaust duct 22 is provided at the exhaust duct 22. FIG. 1 shows several possible introduction points, wherein the invention is not limited to the positions illustrated. The introduction point 44 is particularly preferably situated downstream from the first three-way catalytic converter 28 and upstream from the four-way catalytic converter 32 or a further three-way catalytic converter. The first three-way catalytic converter 28 close to the engine may be heated by engine-internal heating measures, and the four-way catalytic converter 32 or the further three-way catalytic converter may be heated with the hot gas 54 from an exhaust gas burner 42. The hot gas 54 is preferably introduced upstream from a particulate filter 62 to allow additional use to be made of the hot gas for heating the particulate filter 62 during a particulate filter regeneration.

Figure 2:
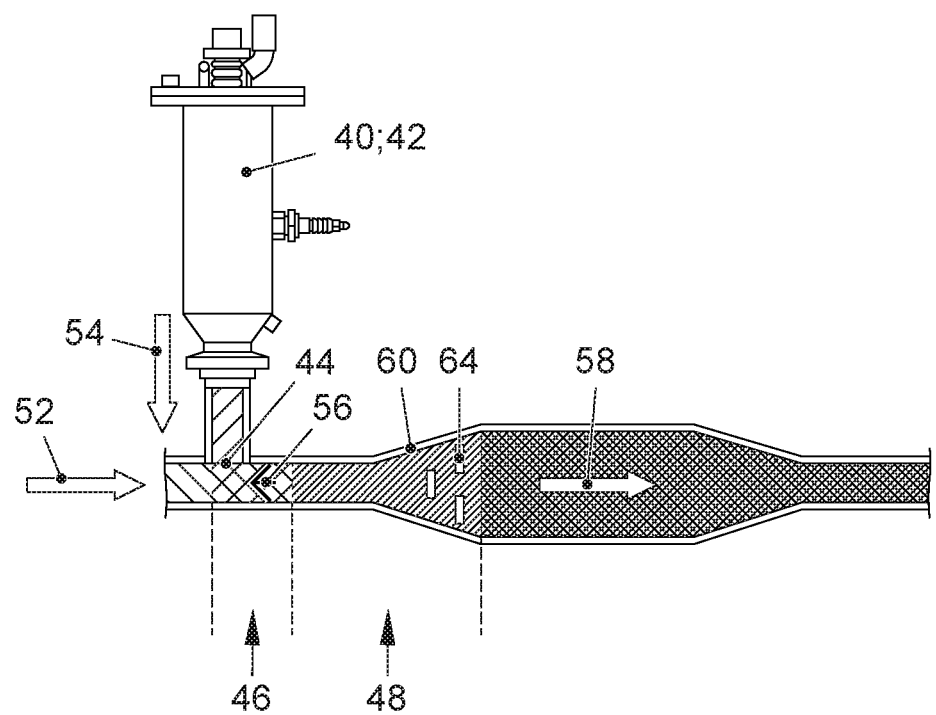
FIG. 2 shows a detail of the exhaust duct of an exhaust aftertreatment system according to the invention.

FIG. 2 illustrates a section of the exhaust duct 22 with an introduction point 44 for introducing a hot gas into the exhaust duct 22. The hot gas 54 is generated by a hot gas generator 40, preferably an exhaust gas burner 42 illustrated in FIG. 2, by combustion of an fuel-air mixture. Provided in the exhaust duct 22 is a mixing zone 46 in which the hot gas from the hot gas generator 40 mixes with the exhaust gas 52 of the internal combustion engine 10. To improve the mixing of the hot gas 54 and the exhaust gas 52, a mixing element 56 may be provided in the mixing zone which deflects and/or swirls the flow in the exhaust duct 22 in such a way that the mixing of the exhaust gas 52 and the hot gas 54 to form a mixed gas 58 is facilitated. Downstream from the mixing zone 46, a reaction zone 48 is situated in the exhaust duct 22, in which the unburned exhaust gas components react with the residual oxygen from the mixed gas 58 and are thus oxidized into unlimited exhaust gas components. The hot gas generator 40 and the mixing zone 46 in the exhaust duct 22 are designed in such a way that afterburning of the oxidizable exhaust gas components, in particular carbon monoxide, unburned hydrocarbons, methane, or hydrogen, is possible, even without a catalytic surface. The objective of the mixing zone 46 is to uniformly mix the exhaust gas 52 with the hot gas 54, so that the best possible oxidation of these exhaust gas components can take place in the subsequent reaction zone 48. In the exhaust duct 22, an element 64 for reducing the flow speed may be situated in the mixing zone 46 and/or in the reaction zone 48. In one very simple embodiment, a cross-sectional expansion 60 of the exhaust duct 22 in the reaction zone 48 is provided in order to reduce the flow speed in this zone 48.

The reaction zone 48 is to be designed in such a way that a sufficient residence time of the mixed gas 58 is ensured for substantial oxidation of the unburned exhaust gas components. The quantity and the temperature of the hot gas 54 are selected in such a way that a temperature above 650° results for the mixed gas 58 in the reaction zone 48. The air ratio of the mixed gas 58 is preferably rich in oxygen (i.e., overstoichiometric), so that a stoichiometric or overstoichiometric mixed gas results in the reaction zone 48, even with an understoichiometric combustion air ratio in the combustion chambers 12 of the internal combustion engine 10.

Figure 3:
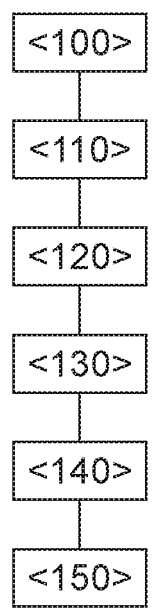
FIG. 3 shows a flow chart for carrying out a method according to the invention for the exhaust aftertreatment of an internal combustion engine.

FIG. 3 illustrates a flow chart of a method according to the invention for the exhaust aftertreatment of an internal combustion engine 10. An exhaust aftertreatment system (e.g., exhaust aftertreatment system in FIG. 1) having a control unit 50 may be configured to carry out the method according to the invention. The control unit 50 operates the internal combustion engine 10 with a fuel-air mixture, and the internal combustion engine 10 introduces exhaust gas 52 into the exhaust duct 22 of the exhaust gas system 20, in a first method step <100>. The operating conditions of the internal combustion engine 10 as well as the temperature of the exhaust aftertreatment components 28, 30, 32, 62 are determined by the control unit 50 in a second method step <110>. If the temperature of the exhaust aftertreatment components 28, 30, 32, 62, in particular the temperature of the three-way catalytic converter 28 or the four-way catalytic converter 32, is below their light-off temperature, or if a complete conversion of the unburned exhaust gas components by the catalytic converters 28, 32 is not possible for other reasons, the control unit 50 causes the hot gas generator 40 to generate and introduce hot gas 54 into the exhaust duct 22 at the introduction point 44 in a method step <120>. In a method step <130>, the control unit 50 causes the mixing element 56, in the mixing zone 46, to mix the hot gas 54 with the exhaust gas 52 of the internal combustion engine 10 to form a mixed gas 58. In the reaction zone 48, the unburned exhaust gas components HC, CO, CH$_4$, H$_2$ are exothermically reacted with the residual oxygen from the mixed gas 58 in a method step <140>. As soon as the exhaust aftertreatment components 28, 30, 32, 62 have reached their light-off temperature, in a method step <150> the control unit 50 deactivates the introduction of the hot gas 54, and exhaust aftertreatment takes place using conventional methods known from the prior art.

In addition to a cold start of the internal combustion engine 10, in which the catalytic converters 28, 30, 32, 62 have not yet reached their light-off temperature, the proposed method may take place in particular with enrichment of the fuel-air mixture in the combustion chambers 12 of the internal combustion engine 10 during an acceleration or in full load operation of the internal combustion engine 10. In addition, a method according to the invention may take place with enrichment for protection of a component of the internal combustion engine 10, in particular for protection of the exhaust valves 16 or of an exhaust aftertreatment component, in particular the turbine 26, the three-way catalytic converter 28, the four-way catalytic converter 32, or the particulate filter 62. Furthermore, enrichment of the fuel-air mixture is provided for regeneration of an exhaust aftertreatment component, in particular for regeneration or desulfurization of a NOx storage catalytic converter 30 or for suppression of an undesirable regeneration of the particulate filter 62 or the four-way catalytic converter 32. In these operating situations, the unburned exhaust gas components may be oxidized by the method according to the invention without the need for a catalytically active surface of one of the catalytic converters 28, 30, 32.

LIST OF REFERENCE NUMERALS

10 internal combustion engine
12 combustion chamber
14 intake valves
16 exhaust valves
18 exhaust gas aspirator
20 exhaust gas system
22 exhaust duct
24 exhaust gas turbocharger
26 turbine
28 three-way catalytic converter
30 NOx storage catalytic converter
32 four-way catalytic converter
34 first lambda sensor
36 second lambda sensor
40 hot gas generator
42 exhaust gas burner
44 introduction point
46 mixing zone
48 reaction zone
50 control unit
52 exhaust gas
54 hot gas
56 mixing element
58 mixed gas
60 cross-sectional expansion
62 particulate filter
64 element for reducing the flow speed

The invention claimed is:

1. A method for exhaust aftertreatment of an internal combustion engine, which on the outlet side is connected to an exhaust gas system, wherein at least a first exhaust aftertreatment component and a second exhaust aftertreatment component are situated in the exhaust gas system, wherein an introduction point for introducing a hot gas is formed at an exhaust duct of the exhaust gas system downstream of the first exhaust aftertreatment component and upstream of the second exhaust aftertreatment component, and wherein the internal combustion engine is connected to a control unit, the method comprising the following steps:

the control unit operating the internal combustion engine with an under-stochiometric fuel-air mixture, introducing the exhaust gases of the internal combustion engine into the exhaust duct, introducing an over-stochiometric hot gas of an exhaust burner into the exhaust duct at an introduction point, wherein the hot gas mixes with the exhaust gas of the internal combustion engine in a mixing zone, so that a stoichiometric or overstoichiometric exhaust gas results downstream from the mixing zone, and oxidizing the unburned exhaust gas components of the exhaust gas of the internal combustion engine in a reaction zone downstream from the mixing zone, wherein the unburned exhaust gas components are reacted with the residual oxygen in the mixed gas, wherein the under-stochiometric fuel-air mixture of the combustion engine is used to regenerate the first exhaust aftertreatment component upstream of the introduction point.

2. The method for exhaust aftertreatment according to claim 1, further comprising the control unit causing adjustment of the understoichiometric combustion fuel-air mixture during an enrichment in an acceleration phase or full load phase of the internal combustion engine.

3. The method for exhaust aftertreatment according to claim 1, further comprising the control unit selecting to operate the internal combustion engine with the under-stochiometric fuel-air mixture for protection of a component of the internal combustion engine and/or of the exhaust gas system.

4. The method for exhaust aftertreatment according to claim 1, wherein the method is carried out in a cold start phase of the internal combustion engine in which a catalytic converter situated in the exhaust gas system has not yet reached its light-off temperature.

5. The method for exhaust aftertreatment according to claim 4, further comprising the control unit deactivating the introduction of the hot gas as soon as an exhaust aftertreatment by means of the exhaust aftertreatment components is possible.

6. The method for exhaust aftertreatment according to claim 1, further comprising the control unit selecting a mixing ratio of hot gas to exhaust gas of the internal combustion engine for which a temperature of at least 650° C. develops in the reaction zone.

7. An exhaust aftertreatment system for an internal combustion engine having an exhaust gas system, wherein at least a first exhaust aftertreatment component and a second exhaust aftertreatment component are situated in the exhaust gas system, and wherein an introduction point for introducing a hot gas is formed at an exhaust duct of the exhaust gas system downstream of the first exhaust aftertreatment component and upstream of the second exhaust aftertreatment component, the exhaust aftertreatment system comprising:

a control unit, wherein the control unit is configured for carrying out a method according to claim 1 when a machine-readable program code is executed by the control unit.

8. The exhaust aftertreatment system according to claim 7, wherein the hot gas is generated by an exhaust gas burner.

9. The exhaust aftertreatment system according to claim 7, further comprising a mixing element situated in the mixing zone.

10. The exhaust aftertreatment system according to claim 7, further comprising an element for reducing the flow speed of the mixed gas situated in the mixing zone and/or in the reaction zone.

11. The exhaust aftertreatment system according to claim 10, wherein the exhaust duct has a cross-sectional expansion in the area of the reaction zone.

12. The exhaust aftertreatment system according to claim 7, wherein the first exhaust aftertreatment component is a first three-way catalytic converter and the second exhaust aftertreatment component has three-way catalytic activity.

13. The exhaust aftertreatment system according to claim 12, wherein the second exhaust aftertreatment component is either a second three-way catalytic converter or a four-way catalytic converter.

* * * * *